Aug. 30, 1966

K. E. CARMICHAEL 3,270,152

AUTOMOTIVE ELECTRIC SWITCH

Filed May 26, 1964

INVENTOR.
KENNETH E. CARMICHAEL
BY
William C. Babcock
ATTORNEY

Aug. 30, 1966  K. E. CARMICHAEL  3,270,152
AUTOMOTIVE ELECTRIC SWITCH
Filed May 26, 1964  2 Sheets-Sheet 2
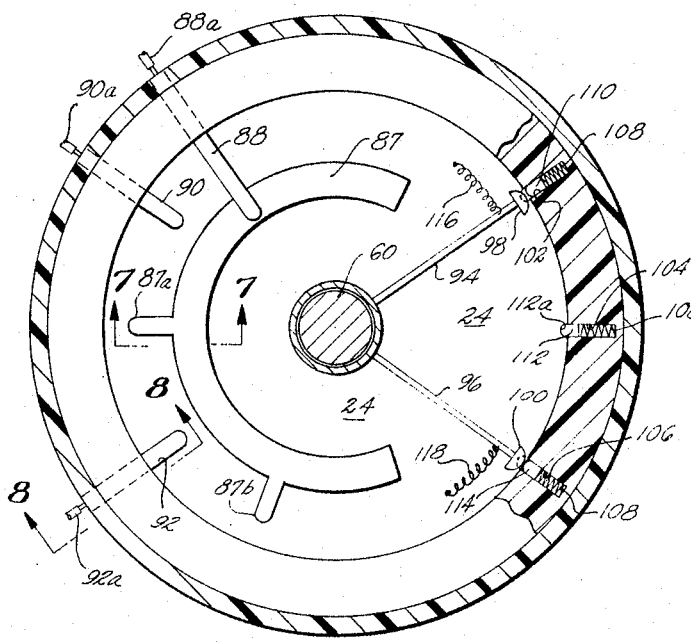
FIG.5
FIG.6
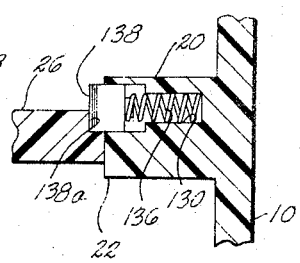
FIG.4
FIG.7
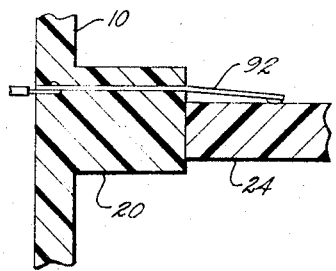
FIG.8
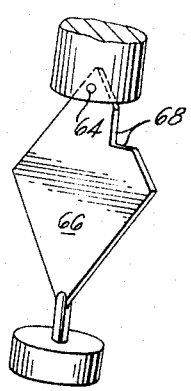
FIG.9
INVENTOR.
KENNETH E. CARMICHAEL
BY
William C. Babcock
ATTORNEY United States Patent Office 3,270,152
Patented August 30, 1966

3,270,152
AUTOMOTIVE ELECTRIC SWITCH
Kenneth E. Carmichael, 107 E. 60th St.,
Long Beach, Calif.
Filed May 26, 1964, Ser. No. 370,152
7 Claims. (Cl. 200—44)

The present invention relates to the field of electric switches, and more particularly to a switch which, when installed in an automotive vehicle, permits the ignition circuit thereof to be placed in an open condition only after the lights of the vehicle have been turned off.

A particularly annoying situation in the operation of automotive vehicles is the parking thereof, turning off of the ignition circuit, and inadvertently leaving the car lights on. Inasmuch as the lights consume a relatively large quantity of electricity, and it takes but a short time for the battery to run down.

A major object of the present invention is to provide a combined ignition and light switch that may be operated in a conventional manner, but which switch is of such structure and operation that the ignition circuit can only be turned off, after the light circuit has likewise been turned off, thereby eliminating the possibility of the lights being inadvertently left on with resultant depletion of the batttery.

Another object of the invention is to provide a switch of simple mechanical structure that can be fabricated from standard, commercially available materials, requires little or no maintenance attention, without elaborate plant facilities for the manufacture thereof, and due to the low cost of its production can be retailed at a sufficiently low price as to encourage the widespread use thereof.

These and other objects and advantages of the present invention will become apparent from the following description of a preferred form thereof, and from the accompanying drawings illustrating that form, in which:

FIGURE 4 is a fragmentary cross-sectional view of the switch, taken on the line 4—4 of FIGURE 2;

FIGURE 5 is a transverse cross-sectional view of the device, taken on the line 5—5 of FIGURE 1;

FIGURE 6 is a combined end elevational and transverse cross-sectional view of a portion of the switch, taken on the line 6—6 of FIGURE 1;

FIGURE 7 is a fragmentary, transverse cross-sectional view of a portion of the device, taken on the line 7—7 of FIGURE 5;

FIGURE 8 is a fragmentary, cross-sectional view of the switch, taken on the line 8—8 of FIGURE 5; and FIGURE 9 is a perspective view of a portion of the device used in actuating the switch.

Figure 1:
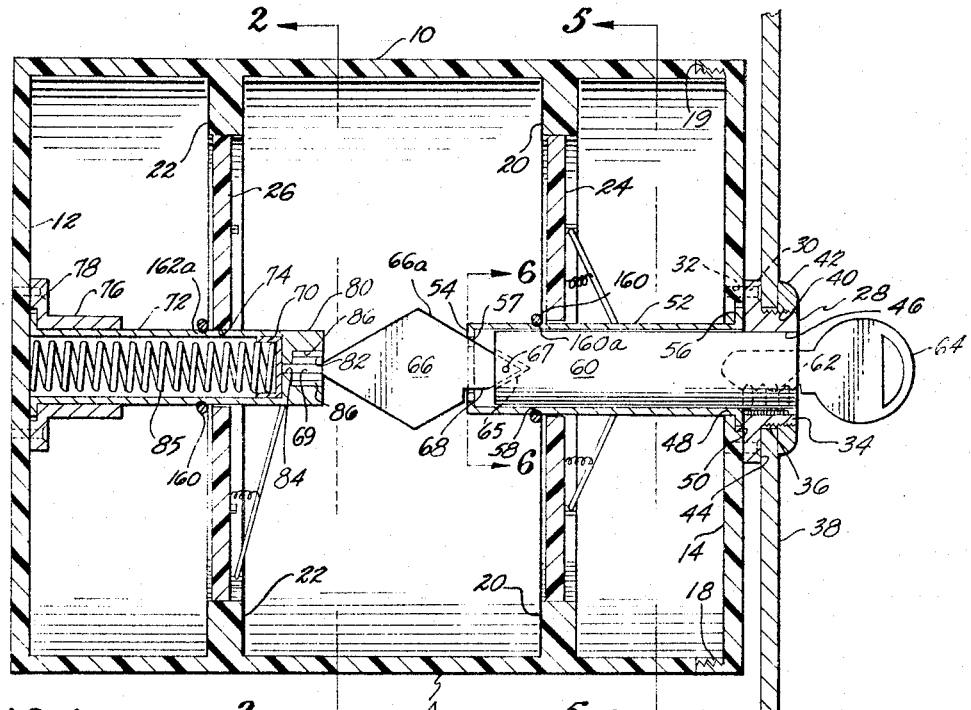
FIGURE 1 is a longitudinal cross-sectional view of the switch.

With continued reference to the drawings for the general arrangement of the invention it will be seen to include a housing A that is preferably defined by a cylindrical side wall 10, a rear end piece 12 and a forwardly disposed end piece 14. The forward end piece 14 is removably mounted on the forward end of the side wall 10 by threads 18 formed thereon that engage threads 19 formed on the forward end of the side wall.

First and second circumferentially extending ribs 20 and 22 project inwardly from the side wall 10, as can best be seen in FIGURE 1, which ribs are longitudinally spaced from one another. The first rib 20 serves to rotatably support a first disc 24, and the second rib 22 rotatably supports a second disc 26. The discs 24 and 26 (FIGURE 1) are substantially thinner than the ribs 20 and 22, within the confines of which they are rotatably supported.

A body 28 is supported externally of the forward central portion of the forward end piece 14 by screws 30 that extend through the body and engage tapped bores 32 formed in the forward end piece 14. Body 28 has a forwardly projecting portion 34 that extends through an opening 36 formed in a panel 38 forming a part of the automotive vehicle (not shown). The portion 34 of body 28 has threads 40 formed thereon that are engaged by a tapped washer 42. When the washer 42 is tightened on body 28 it moves rearwardly, and grips a portion of the panel 38 adjacent the opening 36 between the washer and a body shoulder 44 defined on the body 28.

The body 28 has a bore 46 formed therein that extends longitudinally therethrough, and the forward end piece 14 has a centrally disposed bore 48 formed therein that is coaxially aligned with the bore 46. A circular recess 50 is formed in the forward surface of the end piece 14 and extends outwardly from the bore 48, as best seen in FIGURE 1. A first tubular member 52 is provided that has a ring-shaped lip 54 projecting inwardly from the rear end thereof. The first tubular member 52 has an outwardly projecting flange 56 on the forward end thereof that is disposed in the recess 50. When flange 56 is disposed in recess 50 it is gripped between portions of the forward end piece 14 and the body 28 to rotatably support the first tubular member 52 in the rearwardly extending position shown in FIGURE 1.

The first tubular member 52 is of sufficient length to extend through a centrally disposed opening 58 formed in the first disc 24. The first disc 24 is rotatable relative to the first tubular member 52. A slot 57 is formed in lip 54, as can best be seen in FIGURE 6, the purpose of which will be described hereinafter.

A rod 60 is rotatably and longitudinally movable within the confines of the first tubular member 52, as can best be seen in FIGURE 1. The rod 60 forms a part of a conventional lock that includes tumblers 62 which are actuated by a key 64. The tumblers 62 are supported in the body 28, and rod 60 can only be rotated a substantial distance and moved longitudinally when key 64 engages the tumblers 62 to permit this rod movement.

No detailed description of the key 64 or tumblers 62 is given in combination with the body 28, as this is a conventional lock mechanism. The rod 60 has a forwardly extending centrally disposed slot 65 formed therein that is spanned by a transverse pin 67, and this pin engages the forward extremity of a rigid diamond shaped member 66. The member 66 is of such thickness as to permit a portion thereof to be inserted in the slot 57 (FIGURE 6). The forward part of the diamond shaped member 66 has a recess 68 formed therein, to permit entry of an oppositely disposed portion of a diamond shaped member into the slot 57. The rear end of member 66 is connected to a pin 69, which in turn is rigidly connected to a piston 70 that is slidably and rotatably mounted in a second tubular member 72.

The second tubular member 72 extends through an opening 74 in second disc 26 and is rotatable relative thereto. The rear of second tubular member 72 is rotatably supported in a boss 76 that is affixed to the rear end piece 12, either by being molded as a part thereof or affixed thereto by screws 78 as shown in FIGURE 1. Second tubular member 72 has a relatively thick forward end portion 80 in which a forwardly disposed, longitudinally extending bore 82 is formed that is in communication with a counterbore 84.

Two diametrically opposed slots 86 are formed in the forward end 80 of second tubular member 72 and extend outwardly from the bore 82. The slots 86 are each wider than the thickness of the diamond shaped member 66, for reasons which will later be explained. The pin 69 extends through the bore 82 and is slidably and rotatably movable in the counterbore 84. A compressed helical spring 85 is situated within the confines of the second tubular member 72, and at all times urges the piston 70 forwardly, together with the pin 69 and member 66, to maintain the diamond shaped member in slot 57 as shown in FIGURES 1 and 6.

An arcuate electrical conductor 87 is mounted on the first disc 24, as can best be seen in FIGURE 5. Three circumferentially spaced electrical contacts 88, 90 and 92 extend inwardly from first rib 20 to positions adjacent the first disc 24. The first contact 88 is of such length as to at all times be in frictional engagement with the arcuate electrical conductor 87. Contact 88 is connected by an insulated conductor 88a to the battery (not shown) of the vehicle. The contact 90 is connected by the conductor 90a to the ignition post (not shown) of the vehicle. The contact 92 has an electrically insulated conductor 92a connected thereto which may be extended to a radio or like electrical equipment (not shown) in the automotive vehicle.

When the first disc 24 is rotated in a clockwise direction as viewed in FIGURE 5, extensions 87a and 87b are brought into sliding electrical engagement with the contacts 90 and 92 respectively. Such engagement of the extensions and the contacts permit the ignition circuit of the vehicle to be completed, as well as the circuit that actuates the auxiliary equipment of the type mentioned above.

The first tubular member 52, as can best be seen in FIGURES 1 and 5, has two radially extending, circumferentially spaced legs 94 and 96 affixed thereto (FIGURE 5). The legs 94 and 96 are provided with heads 98 and 100, respectively, that are in frictional contact with the interior surface of the rib 20. The rib 20 has three circumferentially spaced, radially extending recesses 102, 104 and 106 formed therein in each of which a compressed helical spring 108 is disposed. The springs 108 at all times tend to move lugs 110, 112 and 114 inwardly. A recess 112a formed in the peripheral portion of first disc 24 can be engaged by any one of the lugs 138, 140 or 142 when in radial alignment therewith. The legs 94 and 96 (FIGURES 1 and 5) are connected to the ends of helical springs 116 and 118 respectviely, that extend outwardly from the legs 96 in opposite directions. The opposite ends of the springs 116 and 118 are affixed to the forward surface of the first disc 24 by conventional means.

When the rod 60 is rotated in a clockwise direction, as illustrated in FIGURE 5, by use of the key 64, and the rod is in the longitudinal position shown in FIGURE 1, the diamond shaped member 66 and the first tubular member 52 are likewise rotated in a clockwise direction. After the first tubular member 52 has been rotated in a clockwise direction to the extent that the head 98 passes over and depresses the lug 112, the tensioned spring 116 causes rotation of the first disc 24 in a clockwise direction until the recess 112a is radially aligned with lug 114, whereupon the spring 108 in cavity 106 moves the lug 114 inwardly to engage the recess 112a to prevent further rotation of the first disc 24.

After the first disc 24 is rotated in the manner described, the electrical extensions 87a and 87b are in slidable electrical engagement with the contacts 90 and 92 to complete both the ignition circuit and the circuit to auxiliary equipment such as a radio, or the like.

Should it be desired to energize only the auxiliary circuit of which the conductor 92 forms a part when the first disc 24 is in the position shown in FIGURE 5, the key 64 is turned in a direction to rotate the rod 60 in a counterclockwise direction. Such rotation of the rod 60 causes the leg 96 to move in a counterclockwise direction and move the head 100 across the lug 112.

Lug 112 is depressed, and with the spring 118 in tension, the disc 14 is rotated in a counterclockwise direction until the recess 112a is engaged by the lug 110, whereupon further rotation of the first disc 24 is terminated. At the termination of rotation of the disc 24 in a counterclockwise direction just described, the extension 87a is in slidable engagement with contact 92, and the circuit of which the conductor 92a forms a part is completed.

When it is desired that neither the ignition circuit be completed of which the conductor 90a forms a part, nor the auxiliary circuit of which conductor 92a forms a part, the key 64 is rotated to dispose the first disc 24 in the position shown in FIGURE 5 where it is removably locked by the lug 112 which engages the recess 112a in the first member 24.

Figure 2:
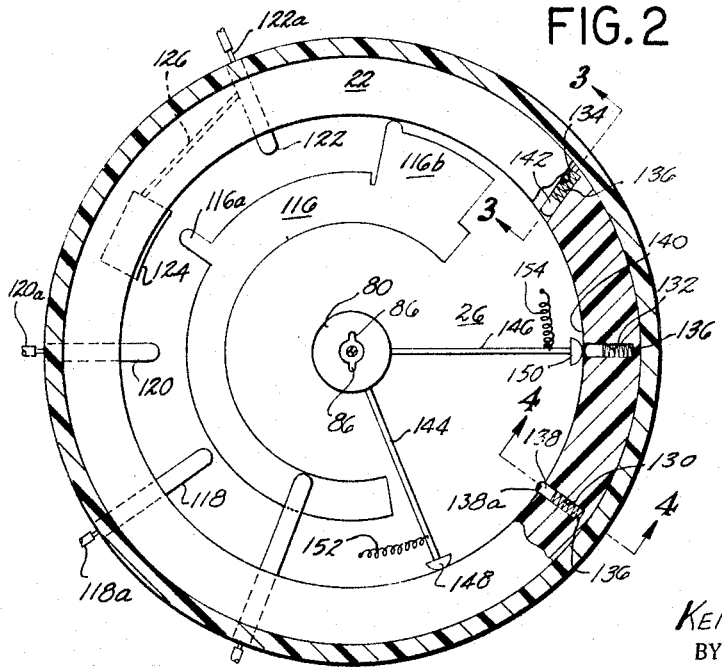
FIGURE 2 is a transverse cross-sectional view of the switch, taken on the line 2—2 of FIGURE 1.
Figure 3:
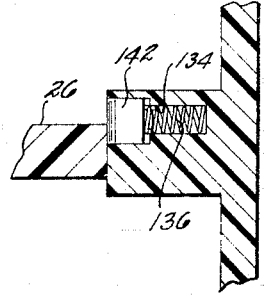
FIGURE 3 is a fragmentary cross-sectional view of the switch, taken on the line 3—3 of FIGURE 2.

An arcuate electrical conductor 116 is mounted on the second disc 26, as can best be seen in FIGURE 2, and this conductor has two extensions 116a and 116b projecting outwardly therefrom. The extension 116b is of substantial width. Three circumferentially spaced contacts 118, 120 and 122 extend inwardly from rib 22. A contact 117, supported by rib 22, is at all times in frictional engagement with conductor 116, and maintains the conductor 116 as a part of the lighting circuit. An insulated conductor 117a is connected to contact 117, as best seen in FIGURE 2, and forms a part of the lighting circuit. Disposed between the contacts 120 and 122 is an electrical resistance element 124 that is connected by a jumper 126 to the contact 122. The contact 122 is connected by an insulated electrical conductor 122a to the dashlight post of the vehicle (not shown). Contact 120 is connected by an insulated electrical conductor 120a to the parking light post (not shown) of the vehicle. The contact 118 is connected by an insulated electrical conductor 118a to the driving light post (not shown) of the vehicle.

Three circumferentially spaced recesses 130, 132 and 134 are formed in sceond rib 22, as shown in FIGURE 2, and a compressed helical spring 136 is mounted in each of these recesses. Lugs 138, 140 and 142 are slidably supported in the inner extremities of the recesses 130, 132 and 134 respectively. A recess 138a is formed in second disc 26 that is removably engaged by the lug 138 when the disc is in the position shown in FIGURE 2 where one of the circuits of which the conductors 118a, 120a and 122a form a part are in the closed position. Two circumferentially spaced legs 144 and 146 project outwardly from the forward end portion 80 of tubular member 72, as can best be seen in FIGURES 1 and 2, and the outer end portions thereof are adjacently disposed to the forward circumferential edge of the second member. Heads 148 and 150 are mounted on the outer ends of the legs 144 and 146 respectively.

When it is desired to energize any one of the lighting circuits of the vehicle, the key 64 is rotated in a direction to move the rod 60 in a clockwise direction to a position where the first disc 24 has turned to place extensions 87a and 87b in engagement with the contacts 90 and 92 as shown in FIGURE 5. This rotation of the disc is accompanied by concurrent rotation of the first tubular member 52, with the diamond shaped member 66 turning therewith due to its engagement with slot 57.

When the diamond shaped member 66 has been rotated to this position in the manner described, the key 64 is used to move rod 60 rearwardly, with member 66 then being disengaged from the slot 57 to enter into engagement with the two slots 86. The key 64 is thereafter rotated in a counterclockwise direction, and the edge 66a of the member 66 that was formerly within the confines of the slot 57 is then riding on the inner edge surface 54a of the lip 54, as may best be seen in FIGURE 6.

The rod 60 may then be turned in a counterclockwise direction without in any way moving the first disc 24. Helical springs 152 and 154 extend outwardly in opposite directions from legs 144 and 146 respectively, and the outer ends of these springs are affixed to the forward face of the second member 26 by conventional means.

When the second tubular member 72 is rotated in a counterclockwise direction due to engagement of the diamond shaped member 66, with slots 86, the head 148 passes over the lug 138 to move the same outwardly and releases it from engagement from the recess 138a. The tension of the helical spring 152 then causes rotation of the second disc 26 in a counterclockwise direction, until such rotation is arrested by the recess 138a which is in engagement with the lug 140. When such engagement of the recess 138a and the lug 140 takes place, the second disc 26 has rotated to a position where the extension 116a is in slidable engagement with contact 120, and extension 116b in engagement with contact 122. Such engagement permits the parking lights and the dash lights of the vehicle to be energized.

Further counterclockwise rotation of the second tubular member 72 results in passage of the head 148 over the lug 140 to move the same outwardly, and release it from engagement with the recess 138a. The second disc 26 then rotates to a position where it is engaged by the spring-loaded lug 142, with the extension 116a being in engagement with contact 118 and extension 116b in engagement with the rheostat 124. The lug 142 is angularly positioned, and as a result can be overridden to permit extension 116b to first engage contact 122 and thereafter rheostat 124 to dim the lights. Extension 116b is of such lengths that it engages rheostat 124 prior to separating from contact 122. Clockwise rotation of the second tubular member 72 places the spring 154 under tension, and the above described operation is then reversed.

When the second tubular member 72 has been rotated to the position shown in FIGURE 2, the diamond shaped member 66 is in longitudinal alignment with the slot 57 and is forced therein due to the compression under which the spring 85 is at all times maintained. After the diamond shaped member 66 has engaged the slot 58, the key 64 can be rotated in a direction to rotate rod 60, member 66, first tubular member 52, and first disc 24 to the position shown in FIGURE 5, where the ignition circuit is broken.

The first and second discs 24 and 26 are held within the confines of ribs 20 and 22 by O-rings 160 and 162, respectively, that resiliently engage grooves 160a and 162a formed in the first and second members 52 and 72 as best seen in FIGURE 1.

From the above description it will be apparent that the switch of the present invention can be used to complete circuits to both the ignition and lights of the vehicle, but that the light circuit cannot be maintained in the closed position when the ignition circuit is in an open condition.

The use and operation of the invention have been described in conjunction with the structure thereof, and accordingly need not be repeated.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. In combination with an automotive vehicle having a light circuit and an ignition circuit, an electric switch that permits said ignition circuit to be placed in an open condition only after said light circuit has been broken, which switch includes:
 (a) a housing;
 (b) first and second coaxially aligned discs rotably supported in said housing;
 (c) first and second arcuate electrical conductors mounted on said first and second discs;
 (d) a first plurality of electrical contacts forming a part of said ignition circuit disposed in said housing and capable of being engaged by said first conductor to complete said ignition circuit;
 (e) a second plurality of electrical contacts forming a part of said light circuit disposed in said housing and capable of being engaged by said second conductor to complete said light circuit; and
 (f) rotatably and longitudinally movable means in said housing that is manually operable for rotating said first disc and first conductor in a direction to complete said ignition circuit when said movable means is in a first longitudinal position, with said movable means when moved to a second longitudinal position capable of being actuated to rotate said second disc and second conductor without moving said first disc and first conductor to a position to complete said light circuit, and with said movable means incapable of being moved from said second to said first longitudinal position until after said second disc and second conductor have been rotated to a position where said second conductor is out of engagement with said second contacts.

2. An electric switch as defined in claim 1 wherein said rotatably and longitudinally movable means includes:
 (a) a first tubular member in said housing that extends through a centrally disposed opening in said first disc and is rotatable relative thereto;
 (b) spring means for connecting said first disc to said first tubular member;
 (c) a rod longitudinally and rotatably movable in said first tubular member;
 (d) manually operable means for rotating said rod and moving said rod longitudinally from a first position to a second position relative said tubular member; and
 (e) locking means on said rod for removable interlocking with said first tubular member when said rod is in said first longitudinal position for turning said first tubular member to the extent that said spring means are deformed and rotate said first disc to a position where said first conductor is in engagement with said first contacts.

3. An electric switch as defined in claim 2 which further includes stop means for limiting the rotation of said first disc after said first disc starts to rotate to a position where said first conductor and first contacts are in engagement.

4. An electric switch as defined in claim 2 which further includes stop means for limiting the rotation of said first disc to a desired one of a plurality of positions, with said first disc when in any one of said positions having said first conductor in engagement with at least a portion of said contacts.

5. An electric switch as defined in claim 2 wherein said rotatably and longitudinally movable means also includes:
 (a) a second tubular member in said housing that extends through a centrally disposed opening in said second disc and is rotatable relative thereto, which second tubular member is coaxially aligned with said first tubular member; and
 (b) a compressed helical spring in said second tubular member connected to said locking means, with said spring at all times exerting a force on said locking means in a direction that tends to maintain said rod in said first position.

6. An electric switch as defined in claim 5 wherein said locking means comprises a diamond shaped rigid member disposed between said first and second tubular members and connected to said rod and spring, with said diamond shaped member removably engaging a recess in said first tubular member when said rod is in said first position.

7. An electric switch as defined in claim 6 wherein said locking means comprises a diamond shaped rigid member disposed between said first and second tubular members and connected to said rod and spring, with said diamond shaped member removably engaging a recess in said first tubular member when said rod is in said first position, and moving out of said recess in said first tubular member into a recess in said second tubular member after said rod and diamond shaped member have been rotated to a position to rotate said first disc and first conductor to a position to complete said ignition circuit, with said diamond shaped member and rod then being rotatable to rotate said second disc and second conductor to a position to complete said light circuit.

No references cited.

ROBERT K. SCHAEFER, *Primary Examiner.*